US006345258B1

(12) United States Patent
Pickens (10) Patent No.: US 6,345,258 B1
(45) Date of Patent: Feb. 5, 2002

(54) INFORMATION SYSTEM FOR NEW HOME BUILDERS

(76) Inventor: William E. Pickens, 11417 Sunset Hills Rd., Suite 102, Reston, VA (US) 22190

(*) Notice: Subject to any disclaimer, the term of this patent is extended or adjusted under 35 U.S.C. 154(b) by 0 days.

(21) Appl. No.: 09/220,598

(22) Filed: Dec. 28, 1998

Related U.S. Application Data

(60) Provisional application No. 60/068,999, filed on Dec. 30, 1997.

(51) Int. Cl.[7] .................................................. G06F 17/00
(52) U.S. Cl. ........................................................ 705/1
(58) Field of Search ............................. 705/7, 8, 9, 10, 705/11; 707/14, 201

(56) References Cited

U.S. PATENT DOCUMENTS

| 4,992,940 | A | * | 2/1991 | Dwokin | |
| 5,189,606 | A | * | 2/1993 | Burns et al. ................... | 705/10 |
| 5,207,792 | A | * | 5/1993 | Anderson .................... | 273/256 |
| 5,255,181 | A | * | 10/1993 | Chapman et al. .............. | 705/8 |
| 5,369,570 | A | | 11/1994 | Parad | |
| 5,490,097 | A | | 2/1996 | Swenson et al. | |
| 5,557,515 | A | * | 9/1996 | Abbruzzese et al. ........... | 705/9 |
| 5,570,085 | A | * | 10/1996 | Bertsch .................. | 340/825.07 |
| 5,572,650 | A | | 11/1996 | Antis et al. | |
| 5,590,269 | A | | 12/1996 | Kruse et al. | |
| 5,689,705 | A | * | 11/1997 | Fino et al. ................... | 707/201 |
| 5,893,087 | A | * | 4/1999 | Wlaschin et al. .............. | 707/3 |
| 5,950,206 | A | * | 9/1999 | Krause ........................ | 707/104 |
| 5,974,392 | A | * | 10/1999 | Endo .............................. | 705/8 |
| 5,987,423 | A | * | 11/1999 | Arnold et al. ................. | 705/14 |
| 5,991,769 | A | * | 11/1999 | Fino et al. ................... | 707/104 |

FOREIGN PATENT DOCUMENTS

JP 411345145 A * 12/1999

OTHER PUBLICATIONS

"PCAgent and CMP Partner to Launch TechShopper", PR Newswire, Dialog File 313, Access No. 1086101, Apr. 1997.*

(List continued on next page.)

Primary Examiner—James P. Trammell
Assistant Examiner—Pierre E. Elisca
(74) Attorney, Agent, or Firm—James Creighton Wray; Meera P. Narasimhan (57) ABSTRACT

An information system for the management of the new home construction process. The system is designed to be used by builders that reuse house plans or product information in the new homes they build. Three distinct steps in the process are used as the basis for the information model: product development, procurement and order fulfillment. The software is divided into three modules based upon three distinct dialects that must be related and communicated efficiently. The option module is used at on-site sales offices, facilitating the automated selection of defined builder options, creating a completed house design with pricing. The procurement/contracting module is used to maintain quotes and contract information on subcontractors responsible for constructing the new home. The production/scheduling module is used to manage the activities of all subcontractors, to ensure timely and efficient meeting of construction deadlines and the approval of all work as completed by subcontractors for payment. The information system uses semantic database tools. The semantic database stores information as objects, relationships, and role players for efficiency in reaching the finest levels of detailed information required to build a new home economically and at predetermined project levels.

21 Claims, 9 Drawing Sheets

OTHER PUBLICATIONS

Kahan, Stuart, "Building consulting services for the construction industry", Practical Accountant, v29, n11, p. 47–54, Nov. 1996.*

"http://www.omware.com/products.html", Omware, Inc. — Products page, p. 1–3.*

"http://www.themasterbuilder.com"—The master builder page, p. 1.*

"http://www.cprsoft.com", CPR constructiion cost estimating software, p. 1–2.*

"http://www.benchin.com", Benchin'Browse–Software: Industry Specification. page, p. 1–2.*

"http://www.benchin.com", Benchin' Product Information Sheet– Vanguard page, p. 1.*

"http://www.primavera.com/products/p3e.html", Primavera Project Planner for the Enterprise page, p. 1–3.*

Derwent –Acc–No. 1998–362976; Carrier D. F. et al., Jul. 1998.*

"PCAgent and CMP Partner to Launch TechShopper", PR Newswire, Dialog File 16, Access No. 1086101, Apr. 1997.*

* cited by examiner

Profit Meta Model

Index to Drawings

FIG. 8

| 1 | 2 | 3 |   |
|---|---|---|---|
| 4 | 5 | 6 | 7 |

Index to Symbols

- ⬜ 406 Object — First digit equals drawing page number / Number of abstractions per drawing page
- ◇ Relationship
- ⬭ Role
- ▢ Characteristic
- ▭ Double lines indicate a Supertype Object
- ◇ (dashed) Dashed lines indicate the symbol is repeated in another part of the model
- ⟶ Indicate a connection to a repeated symbol without being shown
- Connects related symbols in the drawing / Relationship parts number on printed list
- Home  Symbol name

FIG. 11

INFORMATION SYSTEM FOR NEW HOME BUILDERS

This application claims the benefit of U.S. Provisional Application No. 60/068,999, filed Dec 30, 1997.

SUMMARY OF THE INVENTION

The invention provides an information system to be used in the construction of new homes. The system is designed to be used by builders that reuse house plans or product information in the new homes they build. Three distinct steps in the process are used as the basis for the information model: product development, procurement and order fulfillment. A "Core House"™ concept is employed, so that wherever an option is available all possible choices are uniquely defined. The software is divided into three modules based upon three distinct dialects that must be related and communicated efficiently. The first dialect involves marketing, design and sales price. The second dialect involves procurement, contracting and job cost. The last dialect involves production or construction precedence order.

The new invention provides and supports state-of-the-art software products and services for the homebuilding industry to manage and maintain all operating information in a single, comprehensive database. The unique approach relies on the concept of building a "Core House" with options versus the traditional concept of a base house with options.

Also, the new products and services use semantic database tools superior to the relational or object oriented database management system technology employed by other software providers to the industry. As a result, information is not maintained in tables, which typically cause relational or object oriented models to become inefficient before reaching the finest levels of detailed information required to build a new home.

The information is kept in one database. These features allow for maintenance of the system over time in one database without redundancy, avoiding system data overload and avoiding causes of system failure.

The new products define operating information to be used and reused in the following conditions:

as unique views of the company, project, and lot/new home;

as a collection of decisions made during the product development, procurement and order fulfillment processes, which allows the information to be shared by the new homebuilder's staff and communicated to numerous third parties including customers and subcontractors; and as a basis for making informed decisions and planning future strategies.

To provide builders with a comprehensive management system from the new home sales function to the delivery of a finished product to the customer, the invention provides modules. They are the option module—used at on-site sales offices, facilitating the automated selection of defined builder options, creating a completed house design with pricing, the procurement/contracting module—used to maintain all quotes and contract information on subcontractors responsible for constructing the new home, and the production/scheduling module—used to manage the activities of all subcontractors, to ensure timely and efficient meeting of construction deadlines and the approval of all work as completed by subcontractors for payment.

These modules may be used independently to manage a builder's operations, or be linked with existing systems. In all cases, the information generated from these modules may be linked directly with builders' office applications, accounting systems and/or CAD systems. As a comprehensive set of management tools, the invention contributes directly to users' fiscal management and strategic planning initiatives. Additional modules are available.

Existing software products in the new home building industry have been developed using the existing concept of "base house with options", which refers to the most basic or least expensive home that can be built as a starting point, while adding more expensive options to arrive at the desired house. However, from an information management point of view, the portion of the base house that must be removed to add a more expensive option is not defined.

The new software product relies on the new concept of "Core House". This concept creates a hole at each location that an option is possible, requiring an option choice to be made to fill the hole. Each option choice triggers additional decisions unique to that option choice. The semantic database management structure used as the foundation of the new software products allows the option decision tree to be maintained in one comprehensive management system, and at a much more detailed level than customary relational or object oriented database structures, due to the numerous relationships inherent in the process.

Existing software products are organized to respond to simple yes and no questions. The new software accommodates three other kinds of decisions that typically arise in managing new home information. They are:

when there is more than one choice, but only one can be chosen (e.g. one of three front elevations must be chosen);

when a choice is directly dependent on the previous choice (e.g. the finish material to be used on the elevation chosen is to be siding or brick); and when a choice is indirectly dependent on the previous choice due to the complexity of defining a three-dimensional architectural object (e.g. a plan choice affects a front elevation choice).

These and further and other objects and features of the invention are apparent in the disclosure, which includes the above and ongoing written specification, with the drawings.

DETAILED DESCRIPTION OF THE PREFERRED EMBODIMENTS

The invention provides a system for managing new home options.

The following is a summary outline of the concepts used in the development of the information system for new home builders.

1. The first point is that the new system 1 is intended for use by builders 501 that reuse house plans 305 or product information 304 in new homes 303.
2. When information is reused, the process is similar to other manufacturing. Product development is provided by home builder marketing development of projects 207 and product version 304. Procurement is provided by contracting 605 with suppliers and subcontractors 606. Order fulfillment requires sales 404, production or construction 611 of the new homes, and warranty service.

Figure 1:
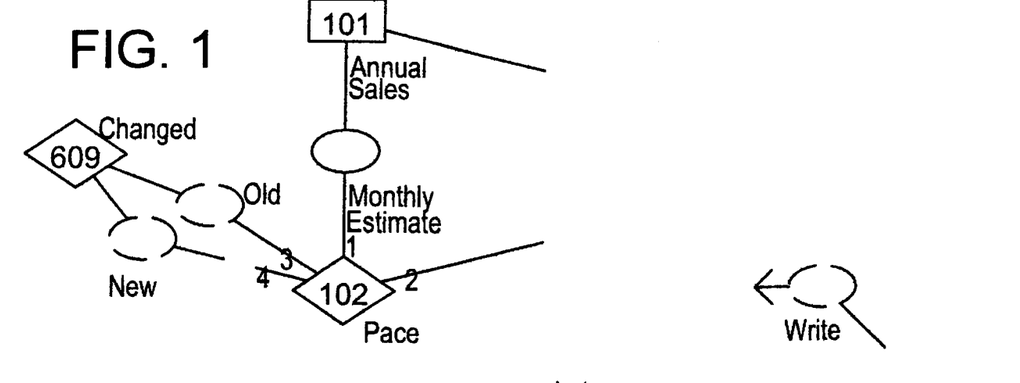
FIGS. 1–7 are part of the overall Meta Model for the system, assembled as shown in FIG. 8 and using the symbols shown in FIG. 9 to produce the overall meta model representation shown in FIGS. 10 and 11.
Figure 2:
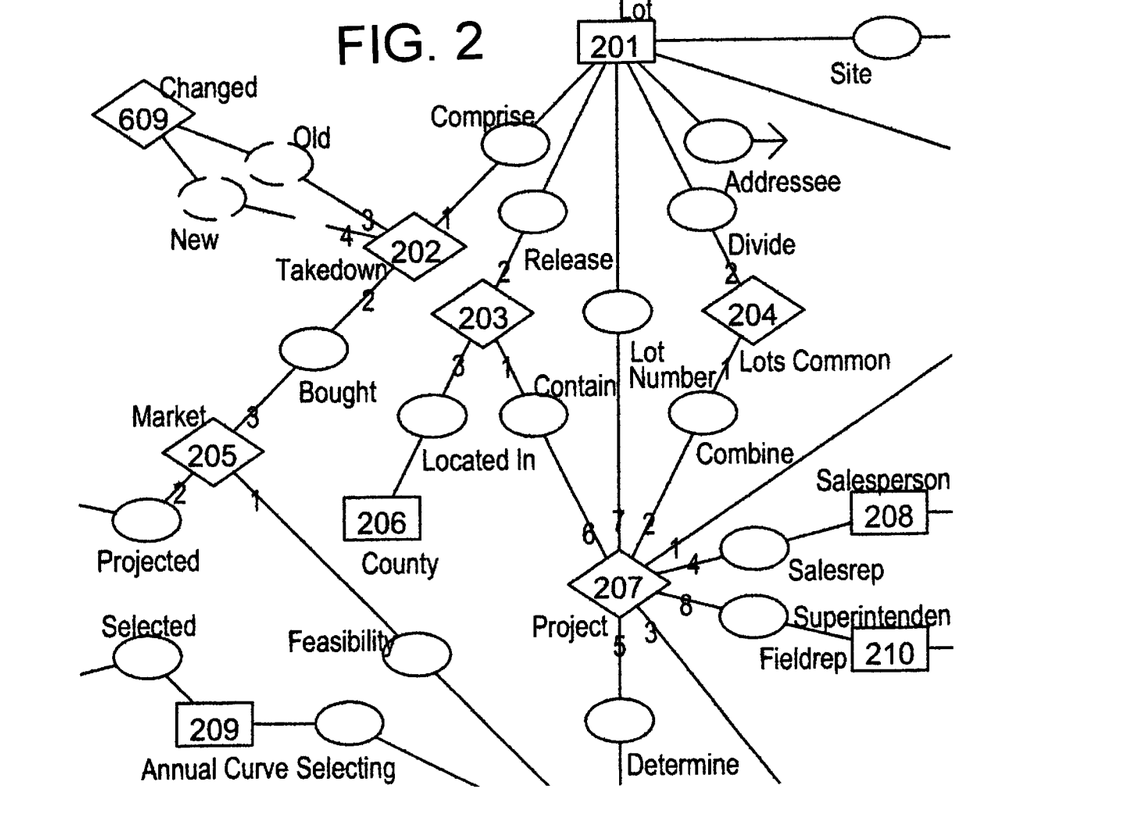
Figure 3:
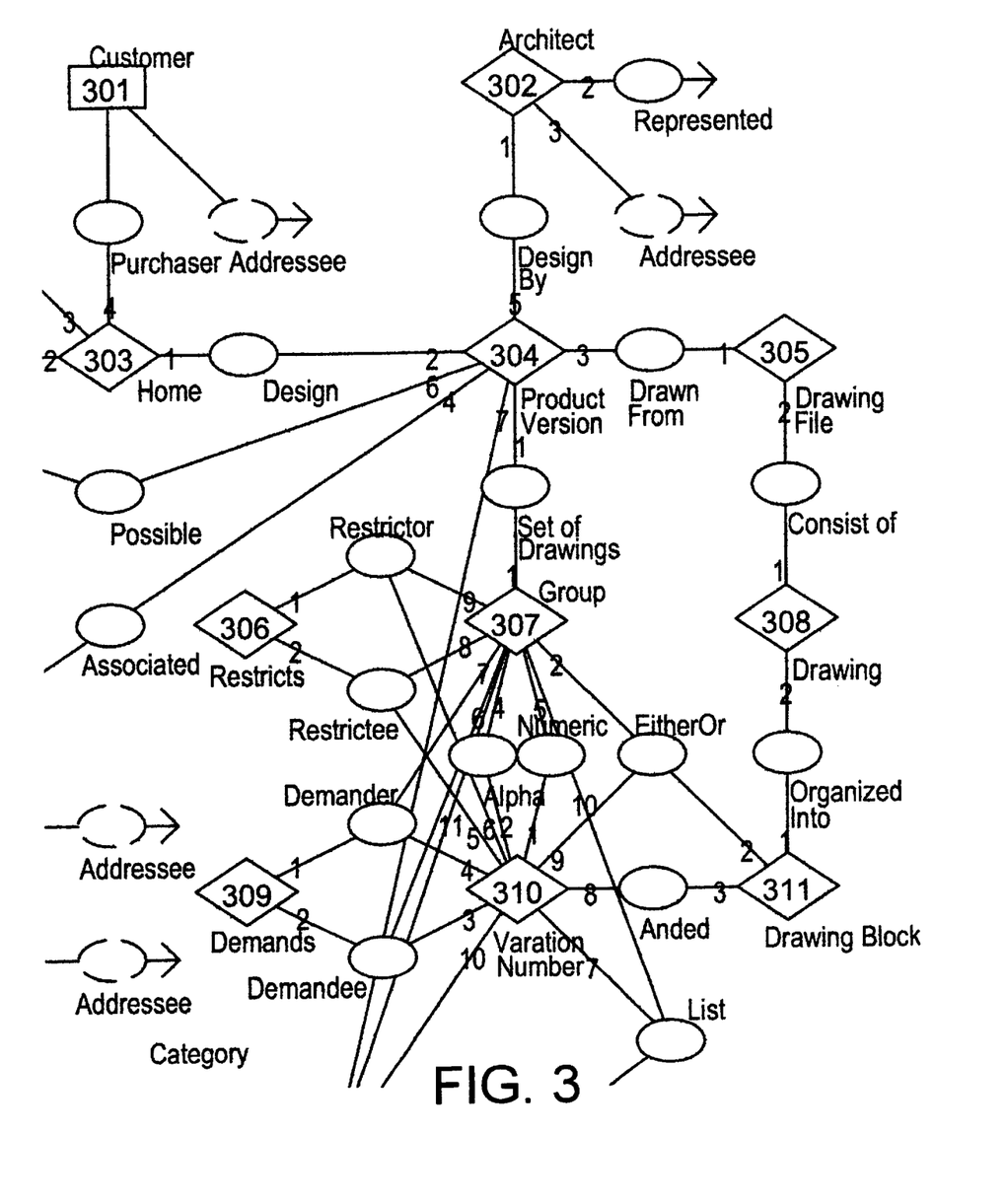
Figure 4:
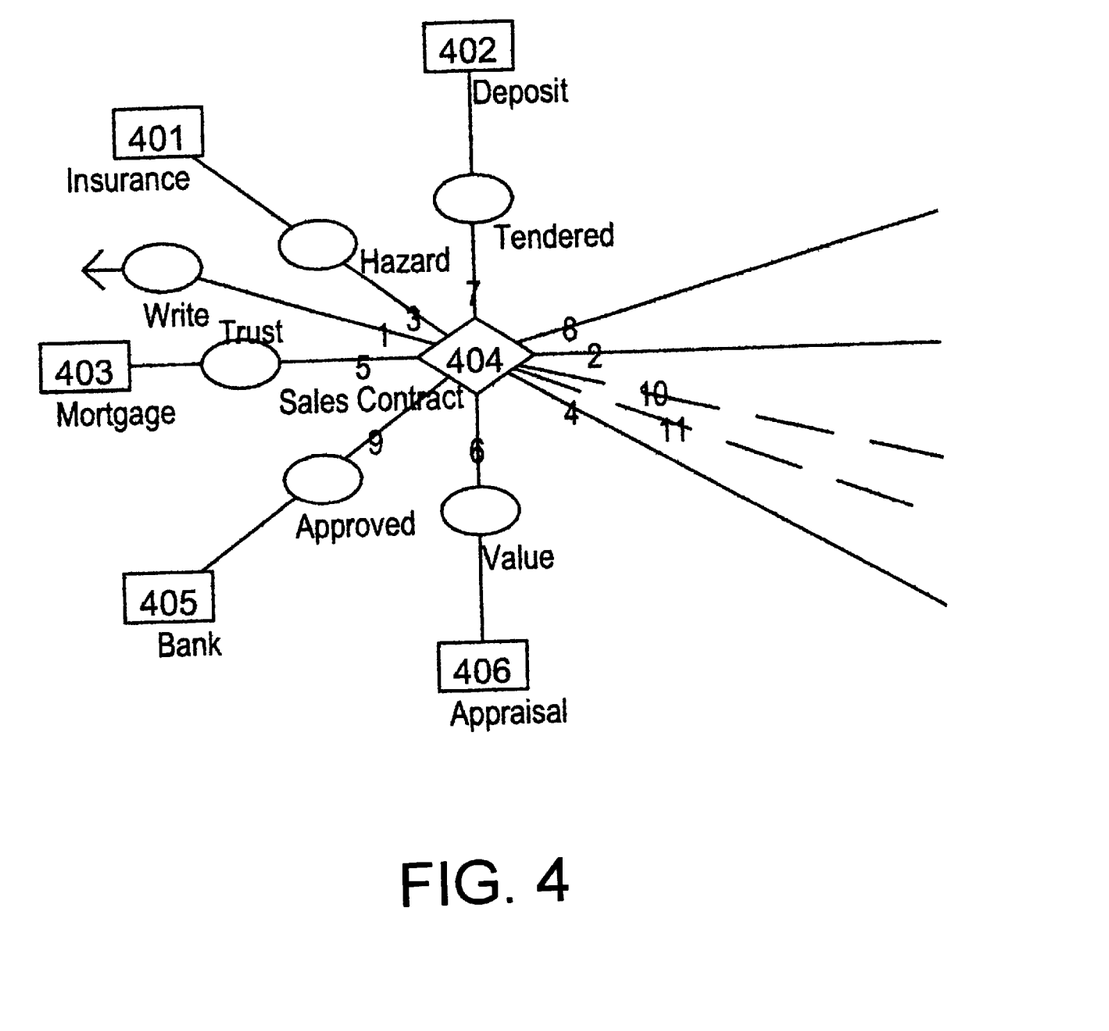
Figure 5:
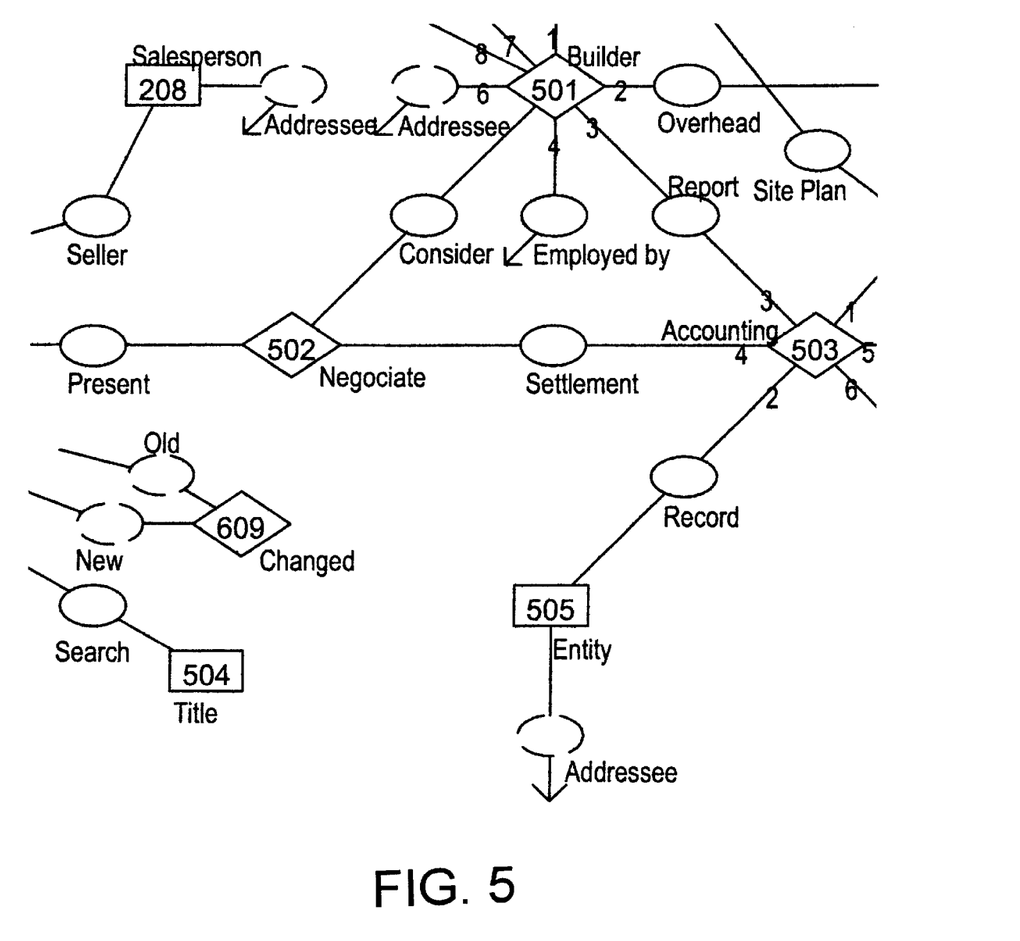
Figure 6:
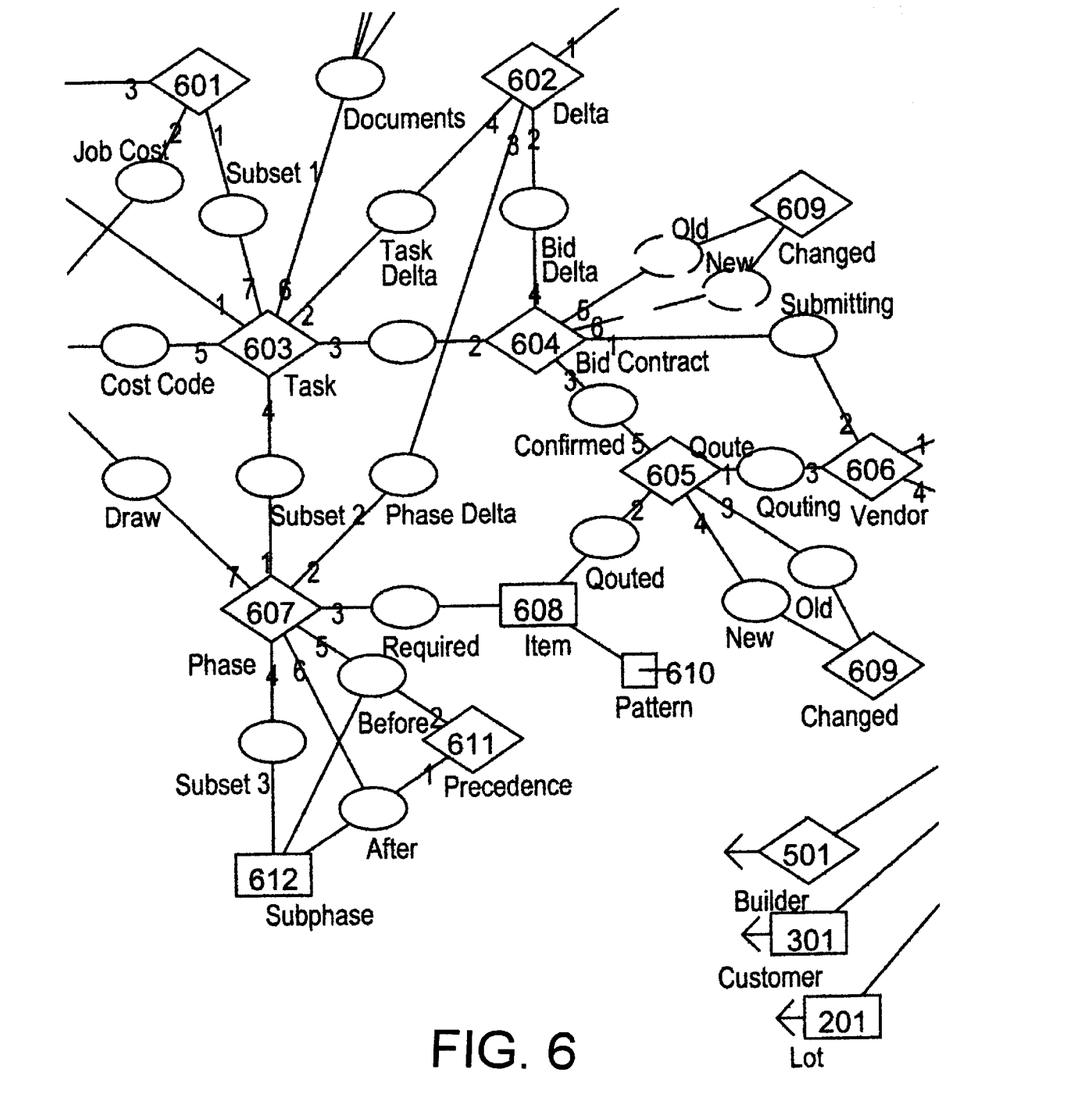
Figure 7:
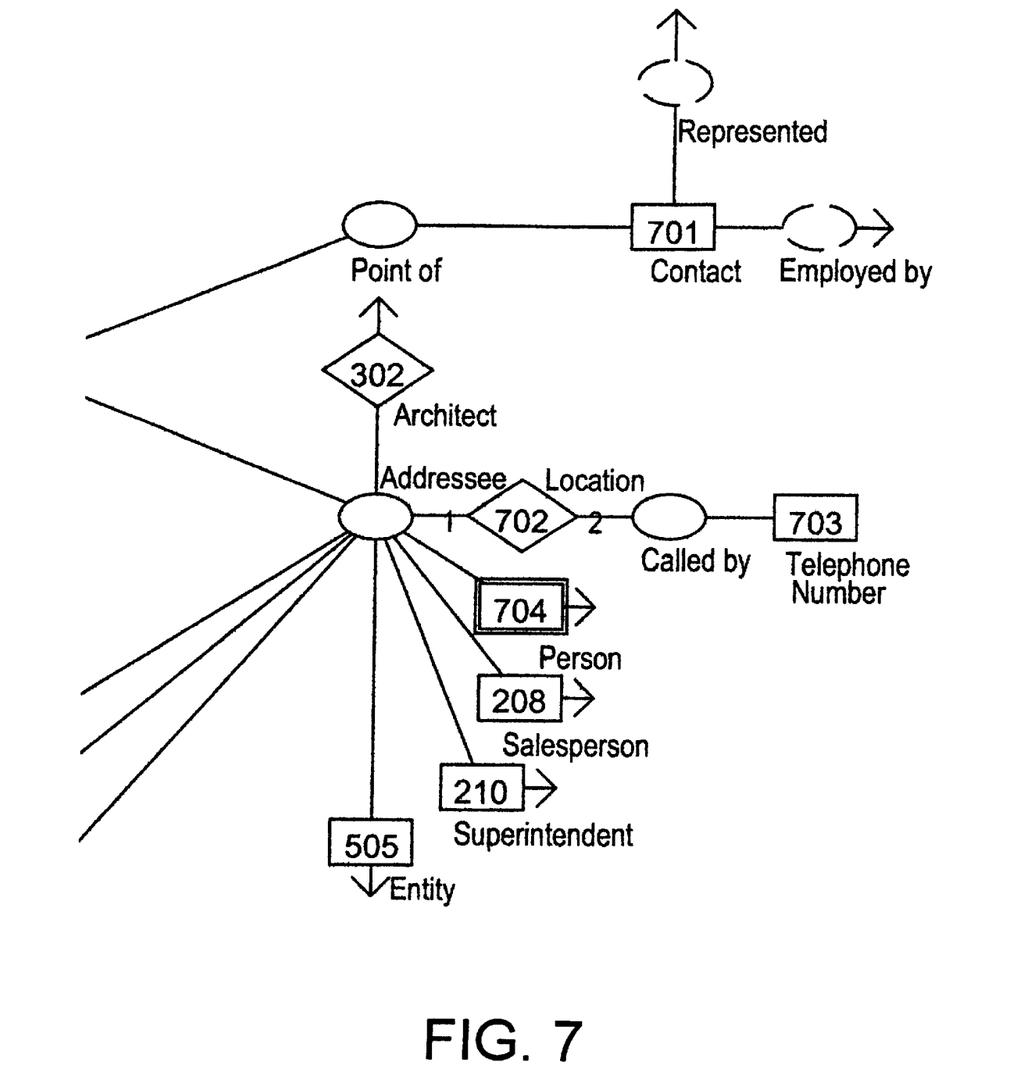
Figure 8:
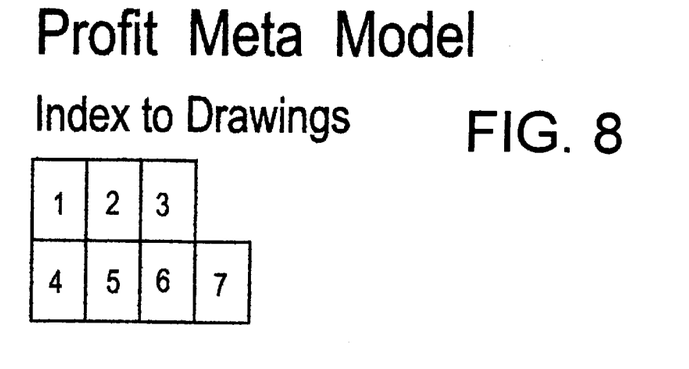
Figure 9:
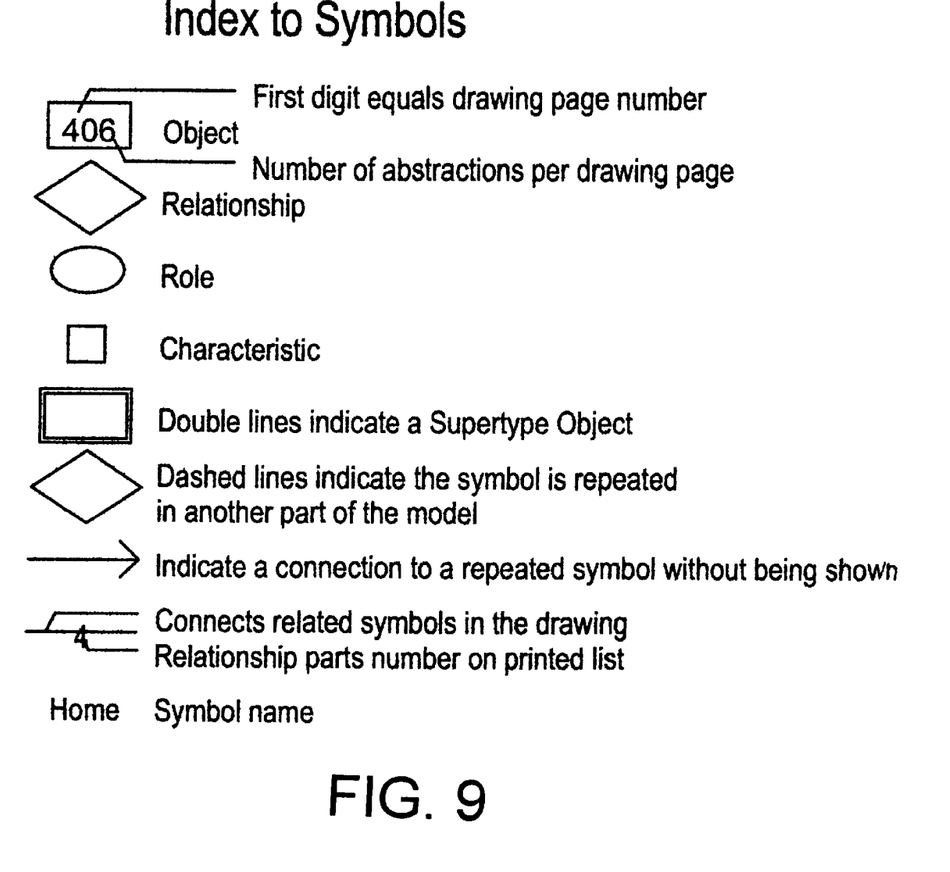
Figure 10:
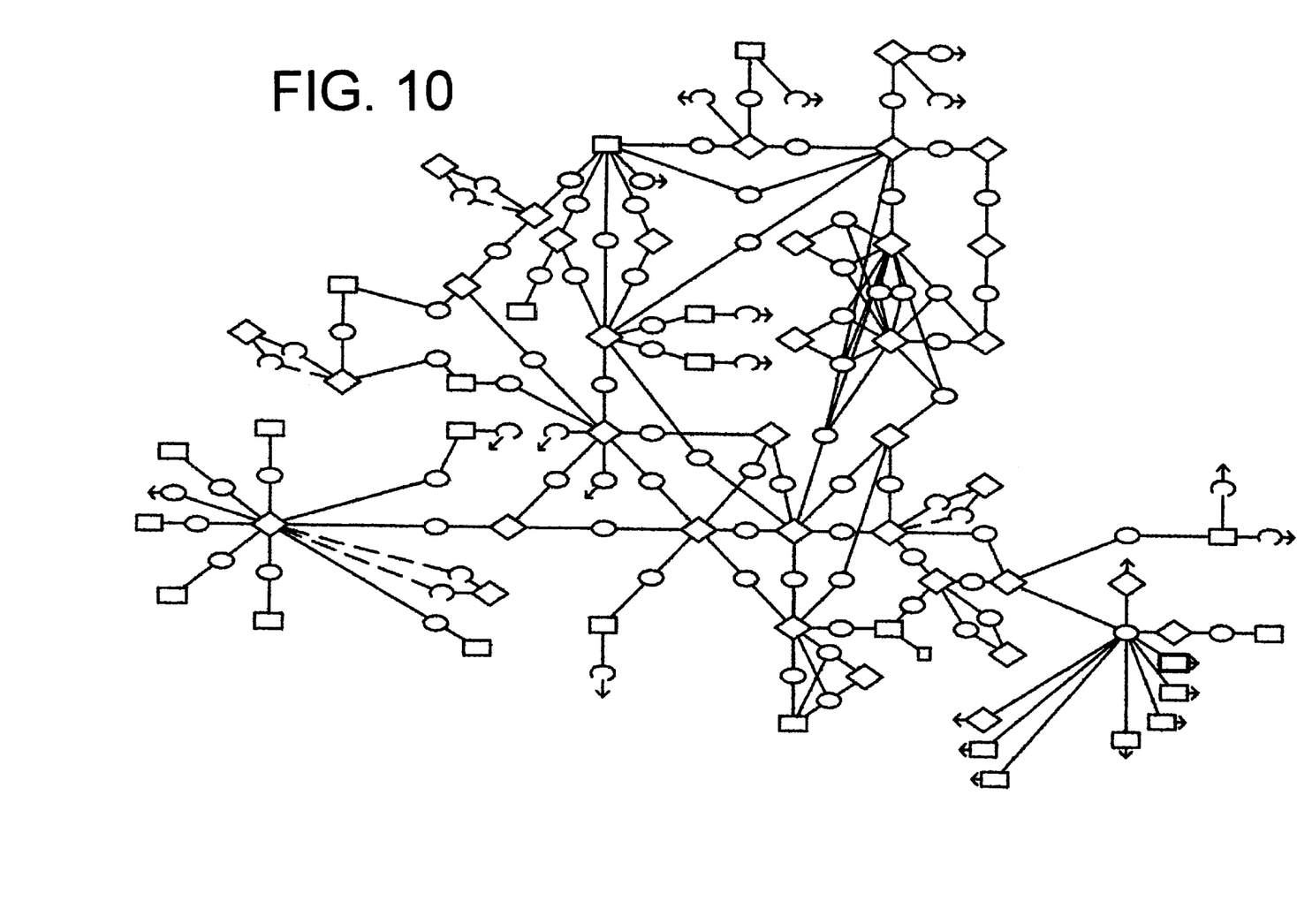
Figure 11:
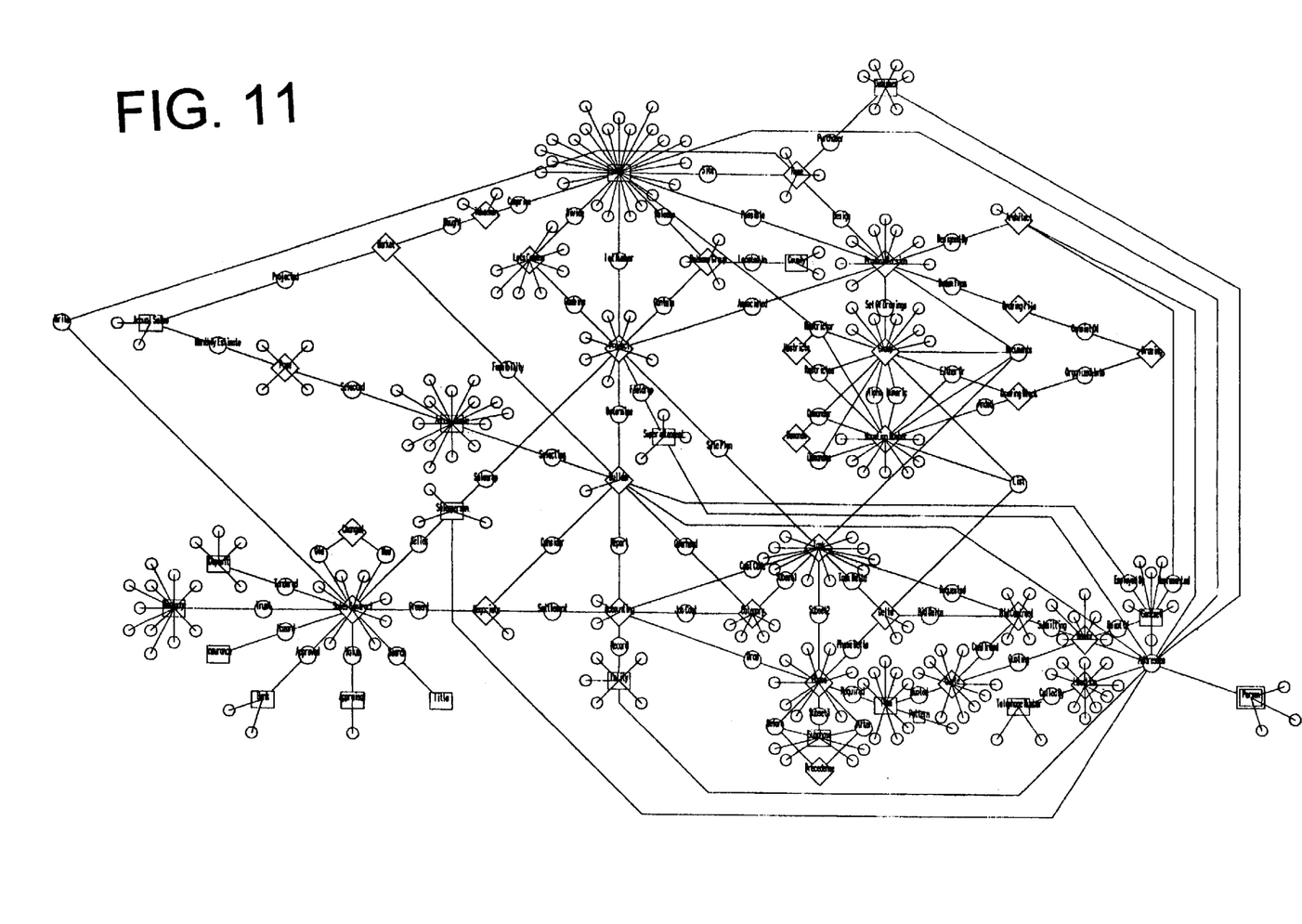

That is the basis for the new information model shown in parts in FIGS. 1–7 which join together as shown in FIG. 8 to produce the attached meta diagram of FIG. 10. The symbols used in the drawings are described and shown in FIG. 9.

Current thinking in the new home industry uses the concept of base house with options. The new system model uses the concept of "Core House" with options 307 and 310.

The definition of a base house is the simplest or least expensive home that can be built, with more expensive options that can be added to the base house. However, from an information management point of view, the portion of the base house that must be removed to add the options is not defined.

With the new "Core House" concept, a hole is created at each location in which an option is possible. When an option exists, it means that more than one choice is possible. Any of the defined choices can be used to fill the holes, defining an instance of any one new home.

The new information system is based on new database technology known as a semantic database management system vs. a relational or objected oriented database management system.

That allows a number of advantages:
1. In the new system, none of the information is kept in look up tables, which cause the relational or objected oriented models to become inefficient before reaching the finest levels of detailed information required to build a new home.
2. All of the information in the new system is kept in one database without redundancy, which is important to the maintenance of the systems over a period of time, while still allowing three major views of the data: The company view, the project view and the lot or individual new home view.

The information in all existing applications is organized to respond to simple yes or no questions. To handle the complexity of the new home information it is necessary to respond to three other types of questions as well:

When there is more than one choice but only one can be chosen (example—One of three front elevations must be chosen), when a choice is directly dependent on the previous choice (example—the finish material to be used on the elevation chosen is to be siding or brick), and when a choice is in indirectly dependent on a previous choice due to the complexity of defining a three-dimensional architectural object (example—a plan choice affects a front elevation choice).

The basic language of new home building is architectural, but due to the specialization of tasks, (three) distinct dialects have emerged which must be related and communicated efficiently. That has been a primary objective of the new software.

The dialects are: The design, marketing and/or sales price dialect, the procurement or contracting/job cost dialect, and the production or construction precedence order of next/after dialect.

These dialects have defined the three modules the new software is divided into, and have driven the dynamic exchange of related information between each module.

The elements of the drawings are described in the charts (pages 1–25) in which the numbered elements are listed in alphabetical order at the end of the specification.

The system is similar to the three-step process used in manufacturing of (1) product development, (2) procurement, and (3) order fulfillment, with the final result being the attainment of continuous improvement through the analysis and reuse of information. The builder 501 continues his business on a project 207 by project 207 basis. A project may be a single lot 201, or more than one lot 201. Before a builder 501 commits to a project 207 in which homes 303 will be sold, market 205 feasibilities will be studied so the pace 102 of annual sales 101 relative to the builder's 501 selected annual curve 209 can be estimated. If the builder 501 determines to proceed with a project 207, the builder 501 may form a separate entity 505 with other investors to purchase the land that may be located in one or more counties 206. If the project 207 is large, the land may be purchased over a period of time through takedowns 202. As the project 207 is purchased and lots 201 are defined, they may be organized by lots common 204 which all contain a common feature, and/or by release group 203 which is the order in which they will become available for sale.

Next the builder 501 will define the product versions 304 to be associated with the project 207 and on which lots 201 it is possible for them to be built. If the builder 501 does not have existing product versions 301 that he thinks will sell, he will employ an architect 302 to design one or more new products. If the architect 302 uses computer-aided design tools, he may organize the product into drawing files 305 that consist of drawings 308 organized into drawing blocks 311 based on the group 307 of options (front elevations), and variation number 310 such as front elevation A, B or C, etc.

When product versions 304 have been defined by the builder 501, the procurement process is related to accounting 503 using the builder's 501 job cost categories 601 made up of tasks 603 broken down into phases 607 for payments. Payment will be related to the requested items 608 and required bid contract 604, quote 605 from a vendor 606 contact 701. The vendor 606 contact 701 is one of many addressees who relate to a number of klocations 702 at which they can be called by a telephone number 703. A super type of addressee is a person 704 that has not been specifically identified in our meta model, such as a golf partner.

Some items 608 for which a quote 605 will be requested will have the property of a color. In some instances, such as vinyl flooring, this color is dependent upon the characteristic called a pattern 610 A quote will be received for each option as defined in the product version 304, and the delta 602 between each related choice must be determined to obtain total cost based on the options selected.

This template is extended one more layer to include subphases 612 which do not involve accounting 503 but are necessary to define the precedence 611 of the construction sequence, such as various building inspections.

Now that the product development and procurement steps have been defined, the order fulfillment step begins with the builder 501 selected release group 203 of lots 201 and their possible product versions 304. A sales person 208 will work with a customer 301 to select a lot 201 and/or a product version 304. Once these are determined, the possible option groups 307 and variation numbers 310 are used for selection by the customer 301, which will restrict 306 and/or demand 309 other options as the choices are made to define the customer's instance of a home 303.

Demander and demandee, restrictor and restrictee relationships are assigned designations to the variations numbers, and the variations numbers are organized in groups according to the restrictor, restrictee, demander and demandee relationship designations. Based on the choices made, a sales contract 404 is written by the customer 301 to be negotiated 502 with the builder 501. When the sales contract 404 is ratified, a deposit 402 will be held by the builder, while the customer obtains approval from a bank 405 for a mortgage 403 based on an appraisal 406. The title 504 is checked and insurance 401 is written.

All of these are being accomplished by the customer 301 with the assistance of the sales person 208 while the builder's 501 superintendent 210 is constructing the home 303 as selected by the customer 301.

During all steps in this process, changed 609 information is maintained.

The order fulfillment portion starts with a customer 301 working with a salesperson 208 to select and purchase a home 303. First a lot is selected 201, and the lot affects the possible product or home version 304 and controls the selected design of the home 303 by the customer 301. The product version includes a group 307 of options, with secondary options 310. Depending on the options selected, other options may be either restricted 306 or demanded 309.

The selected groups 307 and variation numbers 310 are conveyed to create a task 603. Based on the category 601, the task generates a cost code which is given to accounting 503 and reported to the builder 501, so that the price may be negotiated 502 with the customer 301 by the sales person 208. The result is a sales contract 404, which is written with the necessary insurance 401, a deposit 402 tendered, a mortgage 403 created with a bank 405, and an appraisal value 406. A title 504 is created. Changes 609, either new or old, are used to affect the sales contract 404.

The creation of the task 603 contains phases 607 and subphases 612 which are reordered by precedents 611. The task 603 accesses the bid contract 604 and confirms the quote 605 from a vendor 606, which may be a subcontractor. All vendor information is retained with the contact 701. Meanwhile, the variation number 310 and the group identification is supplied to the drawing block 311, which creates a drawing 308 from a drawing file 305, which identifies the specific instance of a product version 304 or home 303 which will be created. The drawing is provided to the customer 301. The product version 304 and the lot number 201 update the project information 207.

The system is originally set up by organizing a project 207 located in a county 206, dividing the project into lots 201 and noting which lots are common 204 in characteristics. The lots are released in groups 203 as coordinated with the county 206.

The system is originally set up by inserting projected annual sales 101 and a monthly estimate to the determine a pace 102. The annual sales are projected according to a market 205. The project 207 is divided into lots 201 with release groups 203 and input concerning the county. Common lots 204 are identified for lot type size and topography. A salesperson 208 is identified with the project 207. One or more salespersons may be so identified. A field representative superintendent 210 is identified, and all information is supplied to the builder 501 who negotiates 502 the sales contract 404, which takes into account the factors as previously stated. The information is provided to accounting, and the record is delivered to the entity 505. Information from the builder 501 and accounting 503 is provided to category 601, and tasks 603 are assigned. One task is the provision of documents from group 307, with drawings 308 taken from drawing files 305.

The basic outline provides a process for home building. The business is continued on a project by project basis. A project 207 can be one or many lots. Houses are sold on a lot by lot 201 basis, one at a time.

The product 304 or architectural plan with options is company information, with subcontract cost on a company (any project) basis or on an individual project basis.

Once the architect 302 has designed the product 304, he is generally no longer involved in the process.

The products 304 are associated with the lots 201 within a project 207 on which they can be built.

The customer chooses a lot 201, which provides available products 304 or a product 304, which provides available lots 201 and the defined options 307, 310 the customer wants in his new home 303 based on the builder's 501 asking price 502, which is typically negotiated 502 by the customer.

Any subcontract costs 605 are maintained for each product 304 with options 307, 310 on a continuous basis by the builder.

When the new home 303 is defined by the customer 301, the builder 501 will know his current cost 503 for the new home.

The drawing file 305, drawing 308 and drawing block 311 are the link to a CAD system set of plans for the product 304 with options 307, 310.

The category 601, task 603 and phase 607 are the link to the accounting 503 job cost system.

The product version 304, group 307 and variation number 310 are how the option information is input in response to the four types of questions that need to be answered.

Lots common 204 are for expenses that apply to more than one lot 201.

Release groups 203 are which lots 201 are available for sale in what sequence.

Pace 102 is the projected number of new homes 303 to be sold in a project 207 on an annual 209 basis.

The specification above outlines these major areas of FIG. 10 in the following order:

Projects (market feasibility and pace).
Products.
Architectural C.A.D. (computer aided design) structure.
Accounting, job cost.
Vendor quotes.
Construction precedence.
Personal information management.
New home sales and construction.
Change.
Building entity.

While the invention has been described with reference to specific embodiments, modifications and variations of the invention may be constructed without departing from the scope of the invention.

I claim:

1. A method of estimating for building plural custom architectural variations in plural skeletal house plans comprising organizing building construction information into a semantic database having objects, relationships between said objects, and roles defined by combinations of said objects and said relationships, and further providing to the database: a customer object, a lot object, a county object, a superintendent object, an annual sales object, an annual curve object, a deposit object, a mortgage object, an insurance object, a title object, an appraisal object, a salesperson object, a bank object, a entry object, a subphase object, a telephone number object, a contact object, a person object, and an item number object.

2. The method of claim 1, wherein the annual curve object and the annual sales object have a pace relationship further comprising a monthly estimate role between the said annual sales object and said pace relationship, and a selected role between said pace relationship and said annual curve object, further comprising a market relationship having a projection role with the annual sales object.

3. A method of providing information for profitability and timely pricing of custom-modified skeletal new home product versions by home builders comprising providing a database, inputting and storing property and lot information, inputting and storing house product version information, inputting and storing variations information and groups of variations information with the product version information, inputting and storing market information, inputting and storing available lot information, inputting and storing financial service information, inputting and storing builder information, inputting and storing subcontractor information, ordering a home by a customer including selecting an available lot and house product version from the database and selecting variations, providing combined selected lot and product version information from the database as a project, providing the project information to a builder in the database, assigning a task from the builder in the database, organizing the tasks into subsets, obtaining quotes from vendors and subcontractors, providing quote information through the task to product version information, providing quotes information through the tasks, the builder, and the project to a salesperson, negotiating a sales contract between the customer and the sales person, providing the sales contract to an accounting component, providing the quotes information to the accounting component, and developing settlement documents therefrom.

4. The method of claim 3 further comprising providing deposit information and the sales contract information to appraisal, title, bank, and mortgage components, and providing information from the appraisal, title, bank, and mortgage components to the sales contract.

5. The method of claim 3 further comprising providing information from the subsets through the task to the product version components in the database.

6. The method of claim 3 further comprising providing information from the estimates through the task to the product version components in the database.

7. The method of claim 3 further comprising providing the market information and annual sales, and projecting therefrom monthly estimates and pace.

8. The method of claim 3 wherein the providing of quotes further comprises calculating bid changes from the quotes.

9. The method of claim 3 wherein the providing of the subsets includes the providing of drawings sets to the variations information.

10. The method of claim 3 further comprising assigning variations numbers to various information and organizing variations in groups.

11. The method of claim 10 further comprising assigning demander and demandee, restrictor and restrictee relationship designations to the variations numbers and wherein the organizing comprises organizing the variations numbers in groups according to the restrictor, restrictee, demander, and demandee relationship designations.

12. The method of providing costing and data on preselected skeletal home plans and variations comprising storing a number of skeletal home plans in a database, storing a larger number of variation plans in the database, storing project and lot components, storing market and projection components, storing product and variation components, storing tasking, costing and accounting components, storing sales contract components, storing builder components, making selections of lot and product variations, providing tasking, costing and accounting information to a builder, according to the selections, providing accounting information to the sales contract components according to the selections, and providing for negotiations according to the selections and accounting information, assigning a project according to the negotiations, and assigning tasks and subsets to the project.

13. The method of claim 12, wherein all of the storing steps comprise storing in a single database.

14. The method of claim 12, wherein the storing, providing and assigning steps are accomplished in a single database.

15. An information system apparatus for management of new home construction process, comprising a software system used by builders that reuse house plans or product information in building new homes, the software system providing three distinct steps in a process used as a basis for the information system: product development, procurement and order fulfillment; the software system being divided into three modules based upon three distinct dialects that must be related and communicated efficiently: an option module, a procurement/contracting module and a production/scheduling module, the option module being used at on-site sales offices, facilitating the automated selection of defined builder options, creating a completed house design with pricing, the procurement/contracting module being used for maintaining quotes and contract information on subcontractors responsible for constructing the new home, and the production/scheduling module being used for managing the activities of all subcontractors, for ensuring timely and efficient meeting of construction deadlines and approval of all work as completed by subcontractors for payment, the information system using semantic database tools, the semantic database storing information as objects, relationships, and role players, variations and restrictors for efficiency in reaching levels of detailed information required to build a new home economically and at predetermined project levels.

16. The method of claim 15, wherein all modules are maintained in a single database.

17. A new home defining, product variation, costing and selling system, comprising computer software having a product variation module containing words describing product variations and a comprehensive listing of product variations with groups of product variations and having restrictors for restricting selections of product variations according to previously determined conflicts of the product variations, a costing module combining the comprehensive listing of product variations and accounting job costs related to each product variation, and a sales module comprising sales contracting variations connected to the product variation module for selecting product variations from the product variation module and connected to the costing module for receiving pricing and accounting information from the costing module.

18. The system of claim 17, further comprising a project module listing projects and listing lots and characteristics of the lots within the projects connected to the project variation module, having the listing of lots connected to the comprehensive listing of product variations, and having the listing of lots and characteristics of the lots connected to the restrictors for restricting selection of product variations according to lot characteristics.

19. The system of claim 18, further comprising a market projection module, and having a pace projector connected to the listing of lots for releasing groups of lots for selection by the sales module.

20. A new home defining, product variation, pricing and selling system, comprising computer software having a product variation module containing words describing product variations and a comprehensive listing of product variations with groups of product variations and having restrictors for restricting selections of product variations according to previously selected variations and previously determined conflicts of the product variations, and a sales module comprising sales contracting information and variations selection and pricing information connected to the product variation module for selecting product variations and receiving pricing information from the product variation module.

21. A method of providing information for profitability and timely pricing of custom-modified skeletal new home product versions by home builders comprising providing a database, inputting and storing property and lot information, inputting and storing house product version information, inputting and storing variations information and groups of variations information with the house product version information, assigning variations numbers to various information and organizing variations in groups, assigning restrictor relationship designations to the variations numbers and organizing the variations numbers in groups according to the restrictor relationship designations, and restricting selecting of variations according to previous selecting of variations, inputting and storing market information, inputting and storing available lot information, inputting and storing financial service information, inputting and storing builder information, inputting and storing subcontractor information, ordering a home by a customer including selecting an available lot and house product version from the database and selecting variations, providing combined selected lot and product version information from the database as a project, providing the project information to a builder from the database, assigning a task from the builder in the database, organizing the tasks into subsets, obtaining quotes from vendors and subcontractors, providing quote information through the task subsets to product version information, providing pricing quotes information from the builder, and the project to a salesperson, negotiating a sales contract between the customer and the sales person, providing the sales contract to an accounting module, providing the pricing quotes information to the accounting module, and developing settlement documents therefrom.

* * * * *